(12) United States Patent
Addink et al.

(10) Patent No.: US 6,944,523 B2
(45) Date of Patent: Sep. 13, 2005

(54) RECORDING AND PROCESSING UTILITY COMMODITY USAGE

(75) Inventors: John Addink, Riverside, CA (US); Sylvan Addink, Iowa City, IA (US)

(73) Assignee: Aqua Conserve, Inc., Riverside, CA (US)

( * ) Notice: Subject to any disclaimer, the term of this patent is extended or adjusted under 35 U.S.C. 154(b) by 36 days.

(21) Appl. No.: 10/433,704

(22) PCT Filed: Dec. 7, 2000

(86) PCT No.: PCT/US00/33453

§ 371 (c)(1),
(2), (4) Date: Sep. 12, 2003

(87) PCT Pub. No.: WO02/46852

PCT Pub. Date: Jun. 13, 2002

(65) Prior Publication Data

US 2004/0064217 A1 Apr. 1, 2004

(51) Int. Cl.⁷ .......................... G05D 7/00; A01G 25/16; B67D 5/08
(52) U.S. Cl. .................. 700/284; 137/78.2; 239/69; 239/71; 705/412
(58) Field of Search .................. 700/284; 137/78.2; 239/68, 69, 71, 74; 705/63, 412

(56) References Cited

U.S. PATENT DOCUMENTS

| | | | | |
|---|---|---|---|---|
| 5,097,861 A | * | 3/1992 | Hopkins et al. | 137/78.3 |
| 5,479,339 A | * | 12/1995 | Miller | 700/16 |
| 5,647,986 A | * | 7/1997 | Nawathe et al. | 210/608 |
| 5,696,671 A | * | 12/1997 | Oliver | 700/284 |
| 5,963,650 A | * | 10/1999 | Simionescu et al. | 705/63 |
| 5,994,892 A | * | 11/1999 | Turino et al. | 324/142 |
| 6,014,089 A | * | 1/2000 | Tracy et al. | 340/870.02 |
| 6,088,659 A | * | 7/2000 | Kelley et al. | 702/62 |
| 6,108,590 A | * | 8/2000 | Hergert | 700/284 |
| 6,314,340 B1 | * | 11/2001 | Mecham et al. | 700/284 |
| 6,402,048 B1 | * | 6/2002 | Collins | 239/63 |
| 6,437,692 B1 | * | 8/2002 | Petite et al. | 340/540 |
| 6,618,709 B1 | * | 9/2003 | Sneeringer | 705/412 |
| 6,836,737 B2 | * | 12/2004 | Petite et al. | 702/62 |

\* cited by examiner

*Primary Examiner*—Paul Rodriguez
(74) *Attorney, Agent, or Firm*—Rutan & Tucker

(57) ABSTRACT

The present invention provides a recording node (100) at a consumer site that is used for the receiving, storing, determining and/or sending of utility commodity information. The recording node (100) is an integral part of networks (370) or can access networks (370) for the receiving and transmitting of information. The recording node (100) is part of a network process control system (300) that includes other nodes, such as a controller (200), computer (320), monitor (330), display (340) and communication node (360). The recording node (100) receives data on utility commodity flow rates, commodity pressure and environmental factors; stores the data; performs determinations on the data; and sends utility commodity information over the network (370) to consumers (380) and/or third parties (381). The utility commodity may be water, electricity and/or gas. The information the consumers (380) and third parties (381) receive over the network (370) from the recording node (100) and other nodes assists them in their management of process systems.

35 Claims, 8 Drawing Sheets

RECORDING AND PROCESSING UTILITY COMMODITY USAGE

FIELD OF THE INVENTION

The field of the invention is management systems, such as irrigation management systems and utility commodity management systems. More particularly, the invention relates to a recording node useful in the receiving, storing, determining and/or sending of irrigation information and utility commodity information and to management systems using such a recording node. The recording node can receive data from other devices and send data to other devices in a network process control system.

BACKGROUND OF THE INVENTION

In arid areas of the world water is becoming one of the most precious natural resources. Meeting future water needs in these arid areas may require aggressive conservation measures. Most individuals are aware of some of the steps they can take to conserve water, such as installing low or ultra low flush toilets, installing water saving shower heads, sweeping rather than hosing off the driveway, checking for leaks in the water system and irrigation system, and irrigating the landscape efficiently. However, with the last two steps, many individuals may not be aware of leaks in their water lines or irrigation systems and/or they are not aware of what measures they can take to irrigate their landscapes more efficiently.

Many automatic irrigation controllers have been developed, and known irrigation controllers range from simple devices that control-watering times based upon fixed schedules, to sophisticated devices that vary the watering schedules according to local geography and climatic conditions.

With respect to the simpler types of irrigation controllers, a homeowner typically sets a watering schedule that involves specific run times and days for each of a plurality of stations, and the controller executes the same schedule regardless of the season or weather conditions. From time to time the homeowner may manually adjust the watering schedule, but such adjustments are usually only made a few times during the year, and are based upon the homeowner's perceptions rather than the actual watering needs of the landscape. One change is often made in the late Spring when a portion of the yard becomes brown due to a lack of water. Another change is often made in the late Fall when the homeowner assumes that the vegetation does not require as much watering. These changes to the watering schedule are typically insufficient to achieve efficient watering. Further, the homeowner will likely not change their irrigation practices until they are made aware of how inefficient their watering practices are.

More sophisticated irrigation controllers use evapotranspiration rates for determining the amount of water to be applied to a landscape. Evapotranspiration is the water lost by direct evaporation from the soil and plant and by transpiration from the plant surface. Irrigation controllers that derive all or part of the irrigation schedule from ETo data (ET irrigation controllers) are discussed in U.S. Pat. No. 5,479,339 issued December 1995, to Miller, U.S. Pat. No. 5,097,861 issued March 1992 to Hopkins, et al., U.S. Pat. No. 5,023,787 issued June 1991 and U.S. Pat. No. 5,229,937 issued July 1993 both to Evelyn-Veere, U.S. Pat. No. 5,208,855, issued May 1993, to Marian, and U.S. Pat. No. 5,696,671, issued December 1997, U.S. Pat. No. 5,870,302, issued February 1999, both to Oliver and U.S. Pat. No. 6,102,061, issued August, 2000 to Addink. However, even with these ET irrigation systems, the consumer will generally modify the irrigation schedule to apply more than or less than the scheduled amounts based on ETo. For example, during the year if any dry spots are observed in the yard, the consumer will likely change the controller setting to increase the amount of water that would be applied and not change it back to the original setting. A modification of the irrigation system to improve distribution uniformity might have corrected the dry spot problem in the landscape without requiring the consumer to change the controller setting. As with the simpler systems, mentioned in the previous paragraph, so also with ET controllers the consumers will likely not change their irrigation practices until they are made aware of how inefficient their watering practices are. Although, the watering practices of consumers, with ET controllers, are generally far more efficient than consumers with simpler systems, the irrigation efficiency of most of their irrigation systems can also be improved.

When watering restrictions are imposed on the use of water by consumers it becomes even more essential to efficiently use the water that is allocated. It may mean the difference between plant survival and plant death. Additionally, when rate structures are imposed on the use of water it would be very beneficial to the user to know, on a timely basis, the quantity of water they are using so they may reduce water usage thereby reducing the use of water priced at the higher rates. This is true with any utility commodity, whether water, electricity or gas, to which a rate structure is applied by the service provider.

Flow meters are used with some irrigation systems and are discussed in U.S. Pat. No. 4,209,131 issued June 1980, to Barash, U.S. Pat. No. 5,176,163 issued January 1993, to Al-Hamlan, U.S. Pat. No. 5,971,011 issued October 1999, to Price and U.S. Pat. Nos. 5,097,861, 5,229,937 and 6,102,061 mentioned above. Irrigation systems discussed in U.S. Pat. Nos. 4,209,131, 5,176,163, 5,229,937, and 6,102,061 use the flow meter primarily to set limits to the quantity of water that will be applied by the irrigation system. In U.S. Pat. Nos. 5,097,861 and 5,971,011 the flow meters are primarily used for leak detection. As indicated above, flow meters are primarily used for specific purposes, such as valve control and leak detection, with very little feedback to the water user on how they may improve the efficiency of their irrigation system based on water flow measurements.

What is required is a process by which the consumer is made aware of the quantity of water that is applied to their landscapes and the quantity of water that should be applied to their landscapes based on the plants water requirements. This knowledge, along with recommendations from irrigation specialists should assist the consumer toward achieving irrigation of the landscape based on the plant's water requirements. Furthermore, it would be beneficial if the same process could be used to detect anomalies with the irrigation systems and with other water using devices at the irrigation site, including water using devices in the home. Additionally, it would be beneficial to the consumer if the process could be used to improve the efficiency in the use of other utility commodities, such as, electricity and gas used at the consumer's site.

The present invention will meet the above listed needs and additionally will provide for the transmission of the utility commodity usage data to the entity that provides the utility commodity so the entity can use the data for billing purposes.

SUMMARY OF THE INVENTION

Systems and methods are provided in which a recording node at a consumer site receives, stores, determines and sends utility commodity information and to management systems that use such a recording node. The recording node at a consumer site comprises: a receiving device that receives at least one of utility commodity flow data, utility commodity pressure data, evapotranspiration (ETo) data, and environmental data; a storage device that stores the data; a determining device that determines usage data; and a sending device that transmits usage data to a consumer and/or third party. The usage data comprises at least one of utility commodity usage, utility commodity usage anomalies, preferred irrigation value, actual irrigation value, and results from the determination of a mathematical relationship between the preferred irrigation value and the actual irrigation value.

Preferably the recording node is embodied in an irrigation controller. Alternatively the recording node may be embodied in a personal computer or any other device including a standalone device.

The utility commodity may be water, electricity and/or gas. The flow data is preferably received from a utility meter but some flow data may be received from a flow meter separate from the utility meter. The flow data received may be raw data or processed data with the flow data being indicative of utility commodity usage at the site.

The received data is preferably from an irrigated site. Alternatively, it is contemplated that the methods and systems of the present invention would apply to a non-irrigated site where there is non-irrigation water, electricity and gas usage. The site may be a residential, commercial, industrial, public or any other site. The received data is preferably obtained from devices or sources local to the site. Alternatively, it is contemplated the devices or sources may be distal to the site but data received from the devices or sources applies to utility commodity usage and/or conditions at the site.

The recording node preferably receives most of the data over a communication network. Additionally or alternatively the recording node may receive some data directly from devices and/or have some data manually inputted in the recording node. For example, the data from the utility meter and sensors is preferably received via a direct hardwire connection but may be received by any suitable wireless link, such as optical, radio, hydraulic or ultrasonic. The ETo data and some environmental data is preferably received over the network and preferably via the Internet but may be received by telephone line, radio, pager, two-way pager, cable, and any other suitable communication mechanism.

The ETo data received by the recording node is preferably current ETo data but may be estimated ETo data or historical ETo data.

It is contemplated that the environmental data is from environmental factors, such as air temperature, soil temperature, solar radiation, humidity, wind, cloud cover, rainfall and so forth.

The storage device for storing the utility commodity flow data, utility commodity pressure data, evapotranspiration (ETo) data, and environmental data is preferably a non-volatile memory.

The determining device is preferably a microprocessor. In a preferred embodiment of the present invention the microprocessor is programmed to determine the utility commodity usage during a period of time, utility commodity signatures of a plurality of utility commodity using devices and/or the utility commodity usage anomalies of a plurality of utility commodity using devices. Additionally, the microprocessor is programmed to determine the preferred irrigation value from the received ETo data, crop coefficient values, irrigation efficiency values and other data inputted and/or received by the recording node. Furthermore, the microprocessor is programmed to determine the applied irrigation value by dividing the irrigation flow data by the area being irrigated. The area being irrigated is preferably preprogrammed in the microprocessor and is preferably obtained from a digital measurement system but may be obtained by any means. The microprocessor advantageously derives a mathematical relationship between the preferred irrigation value and the actual irrigation value. The mathematical relationship may be a ratio of the preferred to the actual irrigation value, the difference between the preferred and actual irrigation values, or any other suitable relationship between the preferred and actual irrigation values.

The period of time used in determining the utility commodity usage, the preferred irrigation value and the actual irrigation value is at least ten seconds but may be for any suitable period of time including one day, seven days, fourteen days, and so forth.

The sending device is preferably a microprocessor disposed in the recording node that is programmed to transmit utility commodity usage, utility commodity usage anomalies, preferred irrigation values, actual irrigation values, results from the determination of a mathematical relationship between the preferred irrigation values and the actual irrigation values and any other useful information to consumers and third parties. The information is transmitted over the network and preferably transmitted via the Internet but may also be transmitted by telephone line, radio, pager, two-way pager, cable, and any other suitable communication mechanism.

Various objects, features, aspects, and advantages of the present invention will become more apparent from the following detailed description that describes a preferred embodiment of the invention, along with the accompanying drawings in which like numerals represent like components.

DETAILED DESCRIPTION

Figure 1:
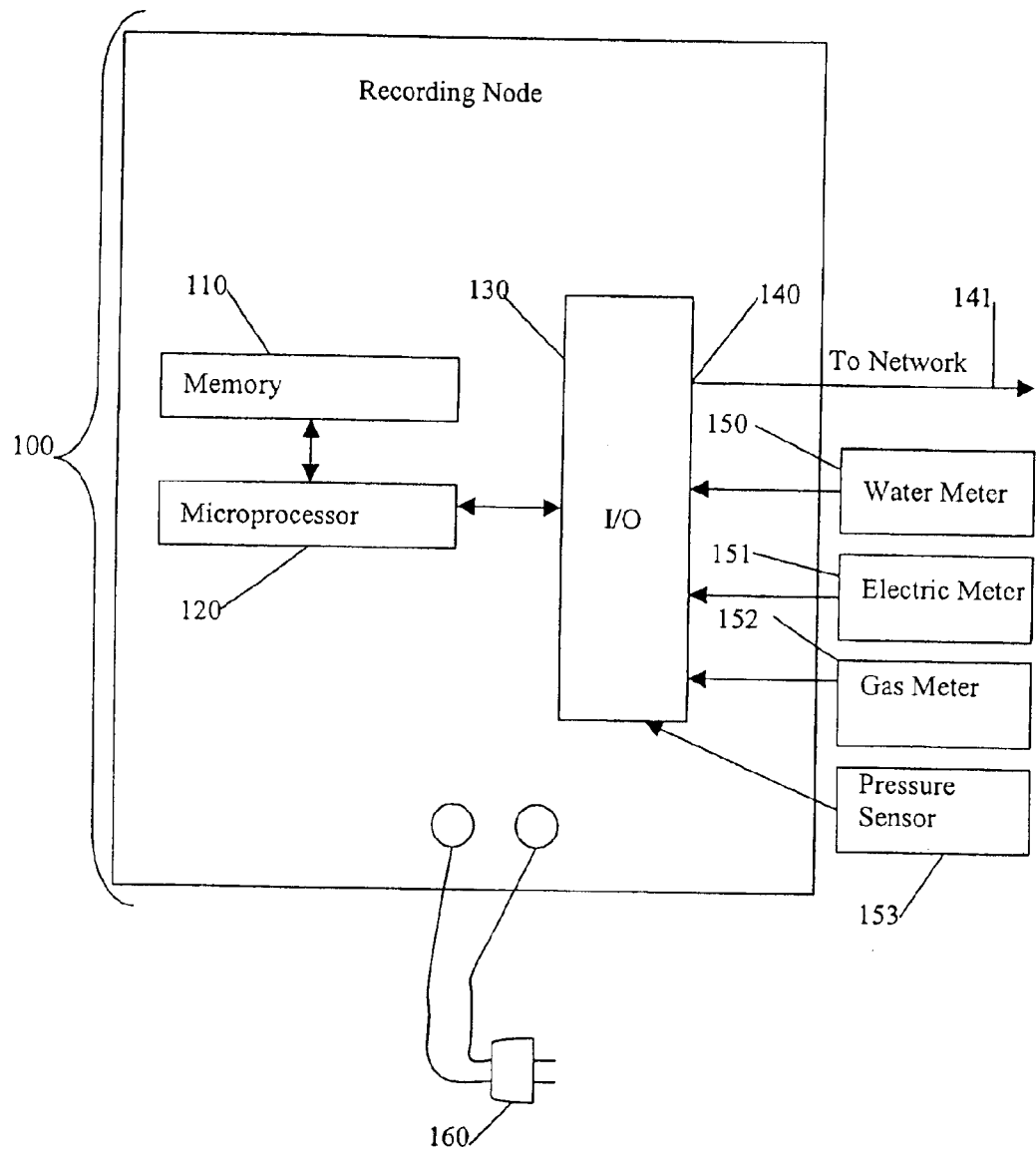
FIG. 1 is a schematic of a recording node according to an aspect of the present invention.

In FIG. 1 a recording node 100 generally includes the following: a non-volatile memory 110, a microprocessor 120, and an input/output (I/O) circuitry 130, connected in a conventional manner. The I/O circuitry 130 permits the recording node to receive and send data and information to other devices via a network (See FIG. 3, 370). The recording node 100 is connected with the network through a communications port 140 by a serial, parallel or other communications connection 141. The recording node 100 receives data from a water meter 150, electric meter 151, and/or a gas meter 152. The recording node 100 receives the utility commodity data from a residential site, a commercial site, an agricultural site or any other site. In a preferred embodiment of the present invention the recording node 100 also receives pressure data from a pressure sensor 153 that measures water pressure in the water line. Each of these components by itself is well known in the electronic industry, with the exception of the programming of the microprocessor in accordance with the functionality set forth herein. There are hundreds of suitable chips that can be used for this purpose. At present, experimental versions have been made using a generic Intel 80C54 chip, and it is contemplated that such a chip would be satisfactory for production models.

In a preferred embodiment of the present invention the recording node has one or more common communication internal bus(es). The bus can use a common or custom protocol to communicate between devices. There are several suitable communication protocols, which can be used for this purpose. At present, experimental versions have been made using an I$^2$C serial data communication, and it is contemplated that this communication method would be satisfactory for production models. This bus is used for internal data transfer to and from the EEPROM memory, and is used for communication with peripheral devices and measurement equipment including but not limited to irrigation flow meters and irrigation pressure sensors.

Figure 2:
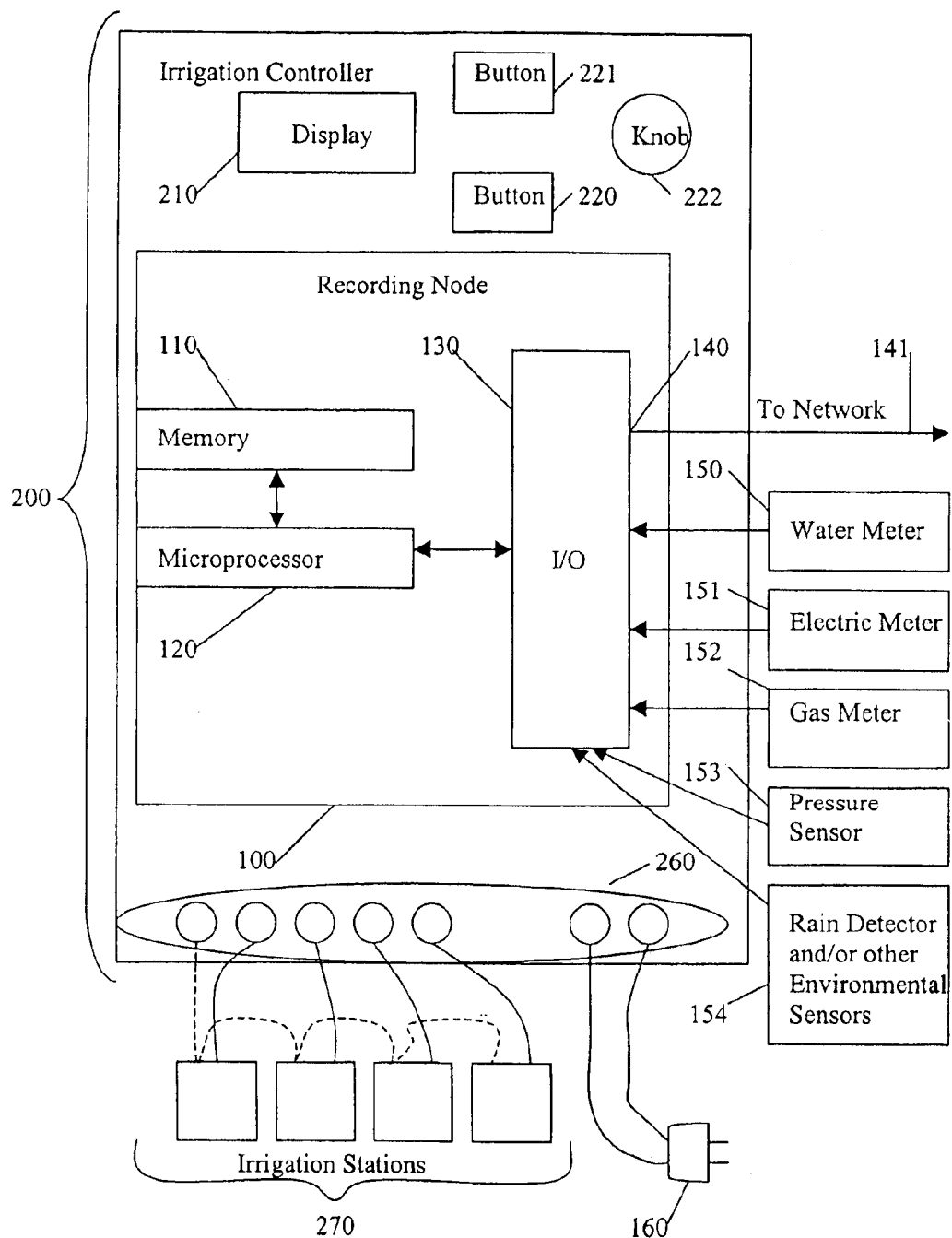
FIG. 2 is a schematic of a recording node embodied in an irrigation controller according to an aspect of the present invention.

Preferably the recording node is embodied in an irrigation controller but it may be embodied in a personal computer or other device including a standalone device. FIG. 2 is a schematic of an irrigation controller 200 with a recording node 100. Some of the devices present in an irrigation controller 200 are also essential devices in a recording node 100. This includes the memory 110, the microprocessor 120, and an I/O 130 circuitry with the communications port 140, and serial, parallel or other communication connections 141. Other devices included in the irrigation controller are manual input devices 220 through 222 (buttons and/or knobs), a display screen 210, electrical connectors 260 which are connected to a plurality of irrigation stations 270 and a power supply 160. The irrigation controller may receive data from sensors other than the utility meters 150–152 and the water pressure sensor 153 including data from a rain detector and/or other environmental sensors 154.

Figure 3:
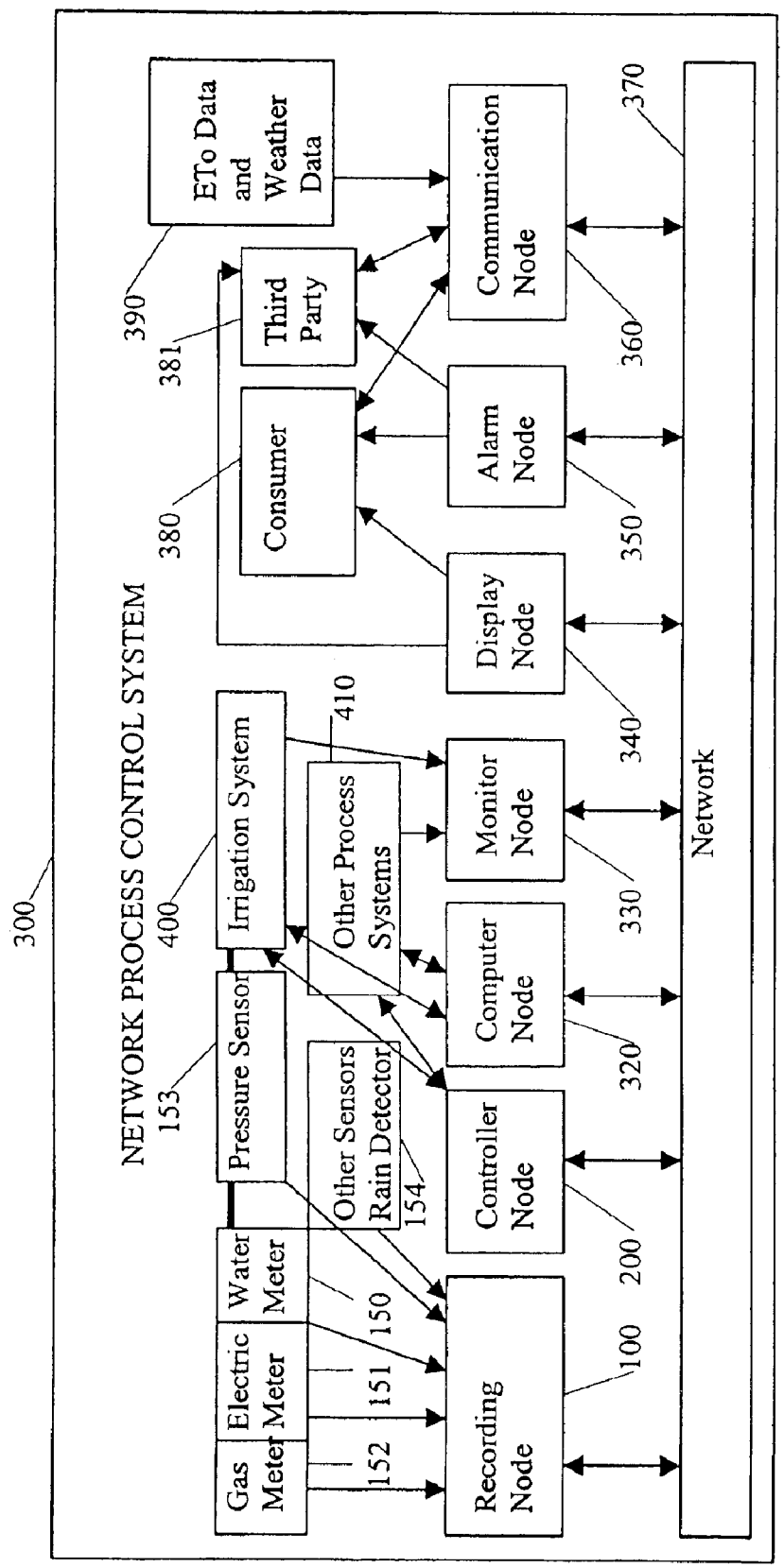
FIG. 3 is a block diagram of a network process control system according to an aspect of the present invention.

FIG. 3 illustrates a network process control system 300 according to an embodiment of the present invention. The network process control system 300 includes management elements, such as: recording node 100; irrigation controller 200; computer node 320; monitor node 330; display node 340; alarm node 350; communication node 360; and a network 370. Preferably all of the nodes may advantageously receive data or information over the network 370 from other nodes or send data or information over the network 370 to other nodes. The network process control system may vary and have more or less elements than those listed above. In a preferred embodiment of the present invention there is no central processor when using the recording node in a network process control system.

Preferably the recording node 100 receives data directly from the gas meter 152, electric meter 151, water meter 150, pressure sensor 153, a rain detector and/or other environmental sensors 154 via a hardwire connection. Alternatively, it may receive the data from the above devices through a wireless connection, such as optical, radio, hydraulic or ultrasonic. The data received by the recording node from the above listed devices may be any combination of raw and processed data. "Raw data" is defined herein to mean pulse or other data outputted by the meters and sensors and otherwise unprocessed except for formatting changes such as conversion from analog to digital, inclusion of appropriate signals to conform to parallel or serial transmission standards, and so forth. Raw data is preferably closely indicative of utility usage and sensor measurements, and may, for example, include digital, analog, pulse, or binary data taken directly from the utility meters 150–152 or sensors 153–154. Processed data is data other than raw data and preferably is also closely indicative of utility usage, and may include, for example, encrypted, daily, weekly, or monthly averages determined from the raw data.

Preferably the ETo data and weather data 390 will be received from the communication node 360 via the network 370 and preferably via the Internet but may also be received by telephone line, radio, pager, two-way pager, cable, and any other suitable communication mechanism. Alternatively it is contemplated that the recording node may receive the ETo data or data from which the ETo data is determined directly from sensors at the irrigation site or other direct mechanisms that do not involve the network. The ETo data, from which the preferred irrigation values are derived, is preferably current data, where the term "current" is used to mean within the last two weeks. It is preferred, however, that the current weather information is from the most recent few days, and even more preferably from the current day. Regardless, ETo data may be actual ETo data received by the recording node 100 or calculated ETo data derived from weather factors received by the recording node 100. Alternatively, the ETo data may be historic ETo data that is stored in the memory of the recording node 100.

The controller node 200 and monitor node 330 interact with the irrigation system 400. The controller node 200 controls the operation of the irrigation system 400. The monitor node 330 monitors the operation of the irrigation system 400. The controller node 200 may also interact directly with the other process systems 410. A few examples of other process systems 410 include, utility commodity billing systems; utility commodity anomaly detection systems in addition to anomalies that are detected with the irrigation systems; compliance with utility commodity restrictions; improved efficiency in gas and electricity usage systems, especially in manufacturing processes; and so forth.

The computer node 320 and the monitor node 330 interact with the other process systems 410. The computer node 320 may also interact directly with the irrigation system 400.

The computer node 320 can either be a dedicated computer that interacts only with other process systems 410 and/or irrigation systems 400 or a personal computer that interacts with other process systems 410 and/or irrigation systems 400 and performs other functions. It is contemplated that there may be two computers in the network process control system, one being a dedicated computer and one a personal computer. The controller node 200 and the computer node 320 can receive from or send data over the network 370 to other nodes.

It is contemplated that the display node 340 will display to consumers 380 and/or third parties 381 information from the recording node 100 on utility commodity usage, utility commodity usage anomalies, preferred irrigation value, actual irrigation value, and results from the determination of a mathematical relationship between the preferred irrigation value and the actual irrigation value. Additionally the display node 340 will display other information, such as that received by the monitor node 330 from the irrigation system 400 or the other process systems 410 and any other information from other devices that would assist in the management of the irrigation system 400 or the management of the other process systems 410. Other information may include problems with the irrigation system, water-pricing information from the service provider, restrictions on water usage, and so forth. The data is preferably sent to the consumer 380 and third parties 381 over the network 370 and preferably by Internet connections. Additionally or alternatively, the data may be sent by wireless connections, including radio, pager, two-way pager, or TV carrier wave, or by wired connections such as telephone line, cable, and by any other suitable communication mechanism.

The consumer 380 is a human being that uses the utility locally, or is responsible for local monitoring or controlling of the usage of the utility at the property. For a residential property, the consumer 380 is usually the homeowner or a renter. In a commercial setting, the consumer 380 is usually an employee of the property owner, manager, leaser, or renter. Formal title of consumers 380 is not important, as the consumer 380 at a commercial property may be referred to as an engineer, building supervisor, etc.

Third party 381 is a legal person other than the consumer 380 that has an interest in utility commodity usage by the consumer 380. A third party 381 need not be a physical person, and may well be a water district or other government agency, a service provider, or an individual or company involved in the care or management of the property, but not locally situated at the property.

Displays can be any reasonable size, shape, composition, and so forth. Display 210 in FIG. 2 displays numbers and characters, and is an LED or liquid crystal type display. Other displays may be located away from the irrigation controller 200, such as in a personal computer. It is also contemplated that the information may be communicated to the consumer 380 and third parties 381 through means other than liquid crystal type displays, such as through printed material, audible messages, such as via a telephone system or any other suitable means that would communicate the information to consumers 380 and third parties 381.

The alarm node 350 may be used in the network process control system 300 to alert the consumer 380 and/or third parties 381 when anomalies occur in the operation of the irrigation system 400 or in the operation of other process systems 410. For example, the anomalies may be irrigation flow anomalies, such as broken irrigation heads or broken irrigation lines that result in excessive actual irrigation values being recorded compared to preferred irrigation values. Additionally, the anomalies may be associated with gas or electric usage, such as a gas leak indicated by excessive gas usage or an electrical short indicated by excessive electricity usage. The anomalies may be anomalies not associated with the recording node, for example, irrigation system 400 or other process system 410 operation anomalies that are detected by the monitor node 330.

The alarm may be through any suitable means, including, for example, a flashing display, an audible alarm, microprocessor generated information with highlighted actual irrigation values compared to preferred irrigation values that were generated by the recording node 100, and other alarm methods.

Figure 4:
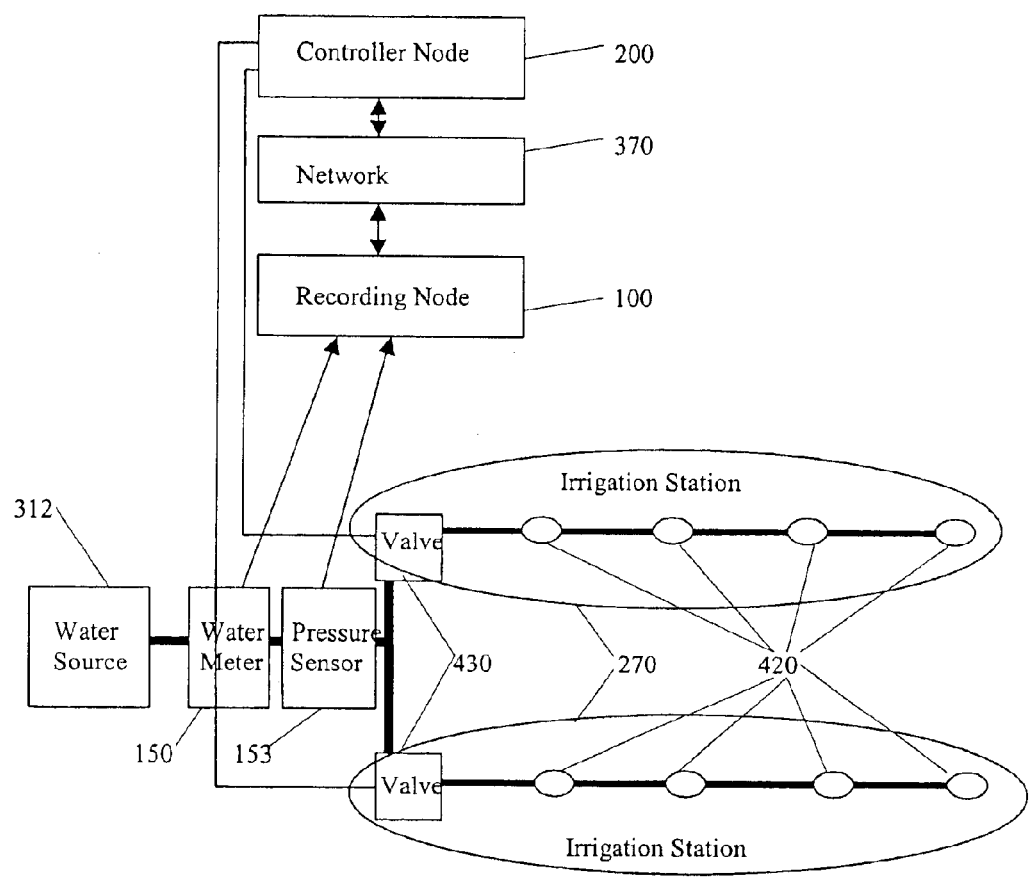
FIG. 4 is a block diagram of an irrigation system according to an aspect of the present invention.

In FIG. 4 an irrigation controller 200 operates two irrigation stations 270. It will be understood that these stations 270 are indicative of any two or more irrigation stations, and are not to be interpreted as limiting the number or configuration of stations. Among other things, the controller 200, activates solenoids (not shown) that open station valves 430 to allow irrigation water to flow from the water source 312 to be distributed to the various irrigation stations 270 and thereby irrigate the landscapes or crops through one or more (four are shown for each irrigation station but it may be any number) irrigation sprinkler heads 420. The recording node 100 receives the irrigation flow data and water pressure data from the water meter 150 and pressure sensor 153, respectively. The recording node 100 can interact with other elements of the network process control system, including the controller, through the network 370.

Figure 5:
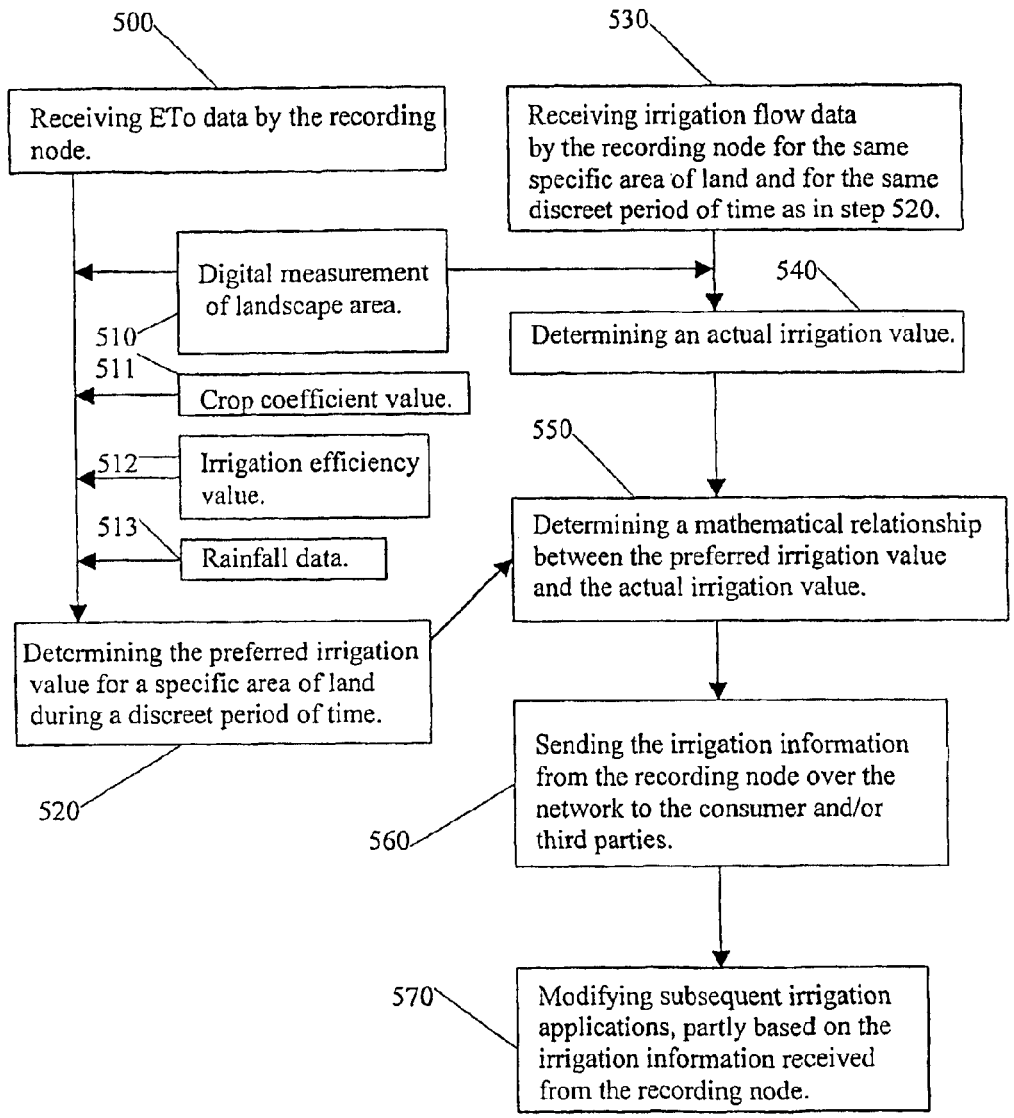
FIG. 5 is a flow chart of steps involved in a preferred embodiment of the present invention.

FIG. 5 is an example of an irrigation management system that uses information from the recording node. In step 500 the recording node receives ETo data. The ETo data may be actual ETo data received by the recording node or calculated ETo data derived from weather factors received by the recording node. Additionally, the ETo data may be historic ETo data that is stored in the memory of the microprocessor.

In step 520 the microprocessor determines the preferred irrigation value for a specific area of land during a period of time. The specific area of land is preferably preprogrammed in the microprocessor of the recording node but may be obtained, at the time the determination is performed, from a distal source over the network. Preferably the landscape area is obtained from a digital measurement system 510. This will generally be a cost effective method for obtaining the landscape area from numerous irrigation sites.

It is contemplated that in addition to ETo data 500 and land area 510, the preferred irrigation value determination 520 is based on other information stored and or received by the recording node that may help in the determination of the best estimate of the water requirements for the plants grown at the irrigated site. Other information may include such factors as, a crop coefficient value 511, an irrigation efficiency value 512, and rainfall data 513.

Advantageously the period of time that the preferred irrigation value is determined over would be one day. However, it may be a time period as little as ten seconds or as much as a year. It is additionally contemplated that the preferred irrigation value may be a plurality of periods of time, for example, daily periods may be accumulated to arrive at a preferred irrigation value for a month time period, seasonal time period, etc.

Preferably the ETo data, whether actual, calculated or historic, received in step 500 and used in determining the preferred irrigation value step 520 will also be used to affect an irrigation schedule executed by the irrigation controller 200, FIG. 4. See the following issued and/or pending patents that discuss in greater detail the use of ETo in the irrigating of landscapes: U.S. Pat. No. 6,102,061 issued August, 2000 to Addink, U.S. Pat. No. 6,227,220 issued May, 2001 to Addink and pending U.S. application Ser. Nos. [09/603104, 09/503104,] PCT/US00/18705, PCT/US00/40685, PCT/US00/22673, and PCT/US00/22819. The disclosures of each of these applications are incorporated herein by reference in their entirety.

The irrigation flow, received by the recording node, is measured during the actual irrigation of the area of land that was used in the determining of the preferred irrigation value and at least for a period of time equal to the period of time used in the determining of the preferred irrigation value, step 530.

In step 540 an actual irrigation value is determined for the total water applied during the period of time. It is contemplated that the determination of water applied may additionally be determined for a period less than the period of time used for the determination of the preferred irrigation value. For example, if the water flow that occurs during the irrigating of a specific site is known to be an approximate amount for a specific period of time, such as during each minute, then the flow of water for a minute may be determined. If the water flow is less than or more than set limits, an alarm may be sent to the consumer or a third party (See 350, FIG. 3) and the irrigation system checked for any anomalies. This might result in the early detection of an irrigation anomaly, which may provide savings to the consumer and/or prevent damage to the plants, for example, if no water was applied to an area due to a stuck valve or if flooding occurred due to a broken line In step 550 a mathematical relationship is determined between the preferred irrigation value and the actual irrigation value for the irrigating of a specific area of land during a period of time. The mathematical relationship may be a ratio of the preferred to the actual irrigation value, the difference between the preferred and actual irrigation values, or any other suitable relationship between the preferred and actual irrigation values.

In a preferred embodiment of the present invention the irrigation information from the recorder node, including the irrigation flow data, preferred irrigation value, actual irrigation value and/or results from the determination of the mathematical relationship between the preferred irrigation value and the actual irrigation value is sent to the consumer and/or third parties, step 560.

Preferably the irrigation application information will be determined, stored and displayed for the consumer and third parties in ordinary units, such as gallons, acre inches, and so forth. Irrigation application information can additionally or alternatively be determined, stored and displayed as percentages, such as the preferred irrigation value is a percent of the actual irrigation value, or in any other suitable ratio or amount terms.

The consumer 380, FIG. 3 may then modify or set subsequent irrigation applications based on the information received from the recording node along with information received from other elements of the network process control system. For example, if the preferred irrigation value is less than the actual irrigation value then subsequent irrigation times may be reduced which will reduce the potential waste of water. If dry spots occur with a reduction in the irrigation amount but the actual irrigation value still exceeds the preferred irrigation value, the irrigation system should be checked for distribution uniformity since some areas of the landscape are receiving excessive amounts of water while other areas are turning brown.

Using the relationship of a preferred irrigation value to an actual irrigation value may also be a tool that water districts, during a time when there is a water shortage, could use to motivate irrigation users to practice efficient irrigating of their landscapes based on ETo data.

Figure 6:
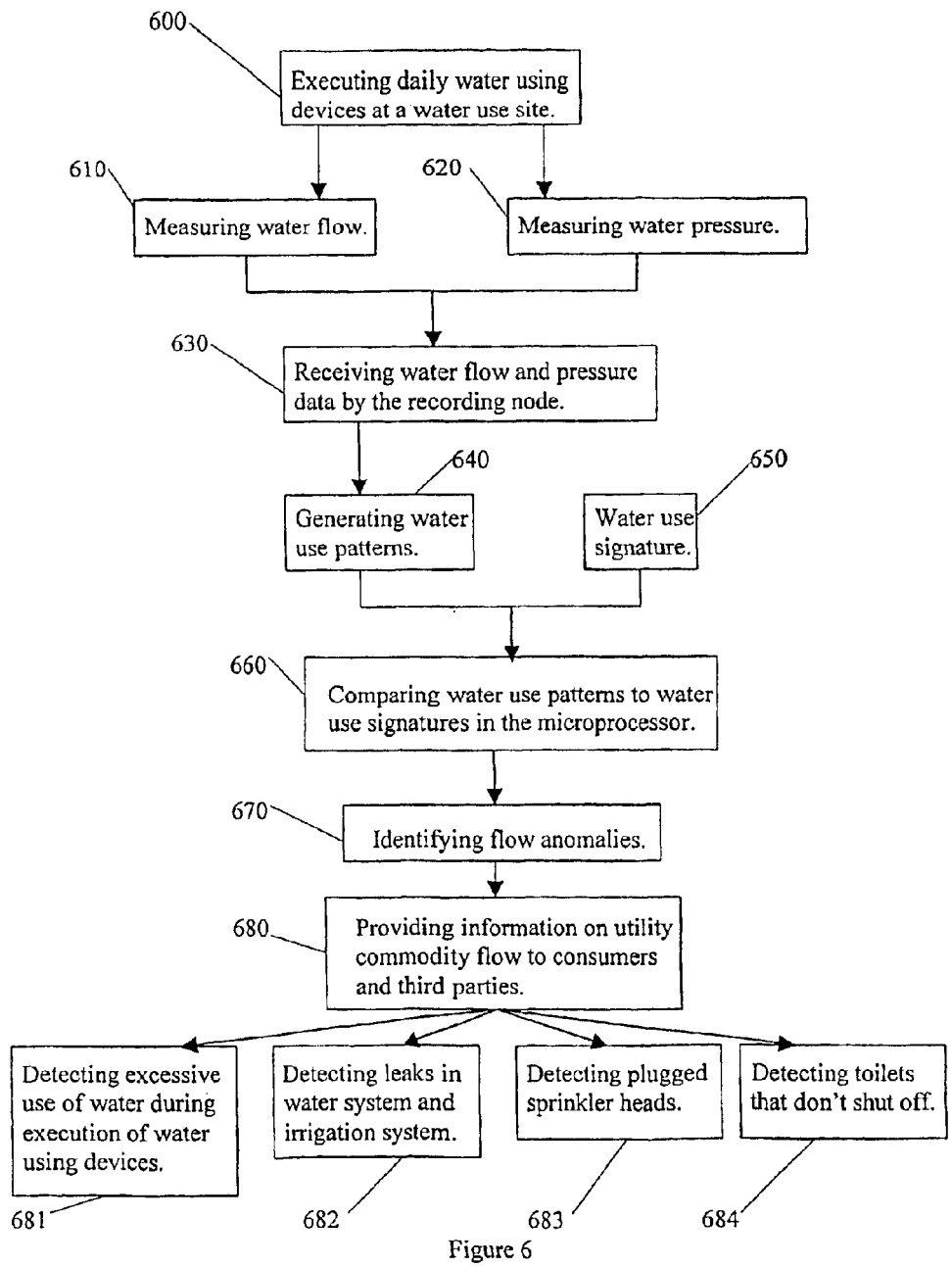
FIG. 6 is a flow chart of steps involved in the use of the signature method in detecting water flow anomalies according to an aspect of the present invention.

Signature data may help in the detection of flow anomalies. FIG. 6 is a flow chart of basic steps involved in the use of water signatures to detect flow anomalies and it is contemplated the recording node will be an integral part in the use of water signatures to detect flow anomalies. In step 600, there are daily executions of water using devices at water use sites. These water use sites can be residential, commercial, industrial or other water use sites. The water using devices may be any presently known or unknown device. At a residential site, water using devices include home appliances such as dish washers and clothes washers; other indoor water using devices such as toilets, showers and faucets, and outdoor devices such as irrigation systems, outdoor faucets that may, for example, be used to wash a car or clean off a driveway. Commercial and industrial sites may use some or all of the same devices as may be present at a residential site, but may alternatively or additionally include water cooled machinery, particulate collectors, and so forth.

Other steps in FIG. 6 include a water meter measuring water flow 610 and a pressure sensor measuring water pressure 620 during the execution of the water using devices, and the recording node receiving the water flow and pressure data 630.

The microprocessor, disposed in the recording node, generates water use patterns from the daily water flow and water pressure data 640. Water pressure is taken into consideration because variation in water pressure causes differences in water flow values. The microprocessor is preferably programmed to store the water use signature 650, and compare the signature against a future water use pattern 660 to identify a flow anomaly with a specific water using device 670, and provide information regarding the flow anomaly to the consumer and/or third parties 680.

It is especially contemplated that the microprocessor generated information may be utilized in helping the consumer and/or third party to recognize excessive water usage 681. In one study, water consumption was reduced by as much as 20 gallons per day per individual by regular water consumption feedback (William H. Bruvold, Municipal Water Conservation, *California Water Resources Center*, 1988, P. 40). The microprocessor generated information may also help in identifying possible leaks or broken heads 682, plugged sprinkler heads 683, and toilets that don't shut off 684.

Although the previous paragraphs discuss excessive water use and water flow anomalies, it is contemplated that corresponding systems and methods may be used for detecting excessive use of gas and electricity and/or flow anomalies with gas and electricity. For example, when a gas flow anomaly is detected, the microprocessor 120, FIG. 1 in the recording node 100 can generate a warning that would be transmitted over the network 370, FIG. 3 and through the communication node 360 to the consumer 380 and/or third parties 381. Where gas usage is substantially higher than normal, the microprocessor 120, FIG. 1 can be programmed to affect the shutting off of the gas at the property. In a similar manner, systems and methods described herein can be used to detect unusually high uses of electricity, which may assist consumers 380, FIG. 3 in conserving electricity.

The signature method is discussed in greater detail in a recent patent application, U.S. application serial number PCT/US00/15480 the disclosure of which is incorporated herein by reference in its entirety.

Figure 7:
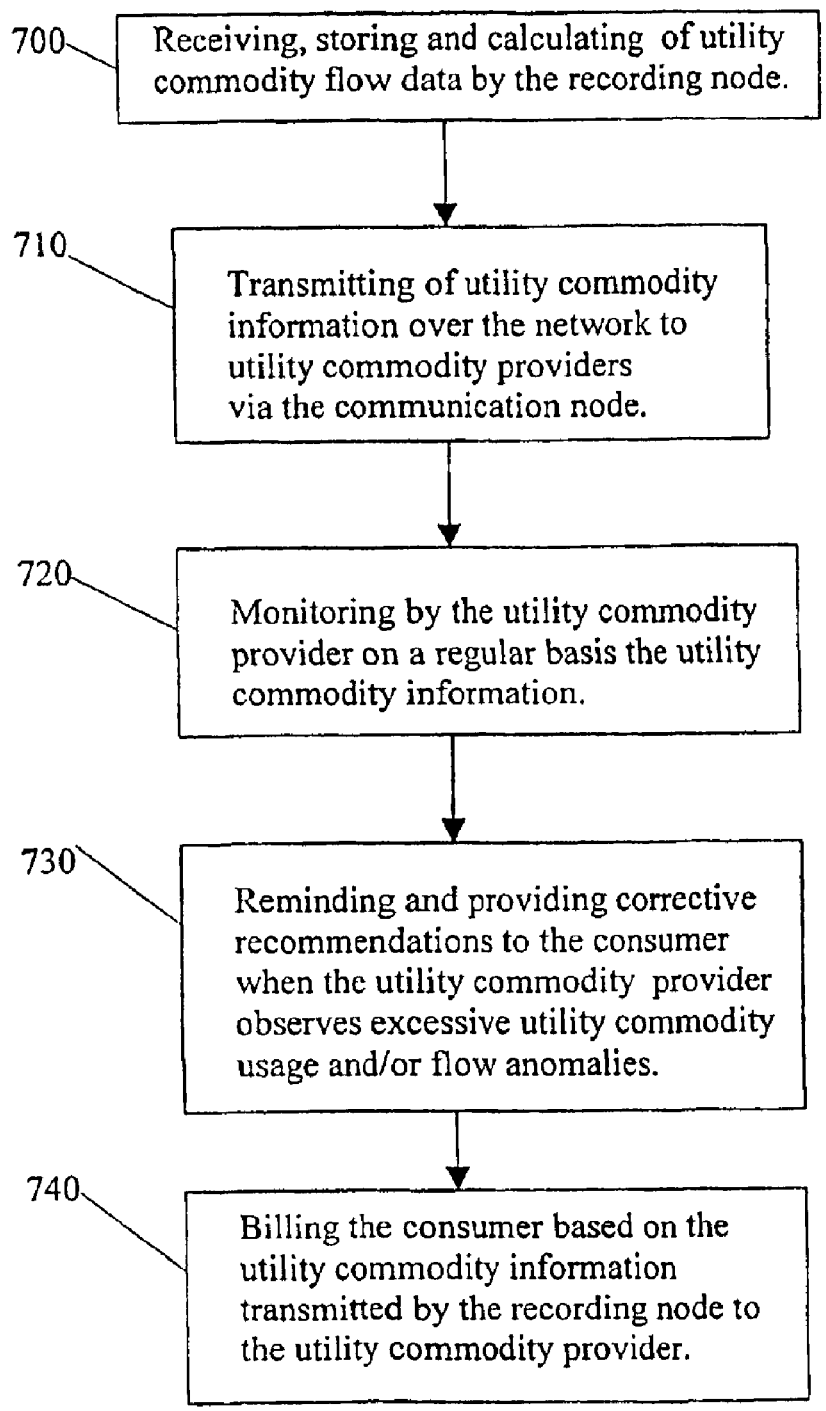
FIG. 7 is a flow chart of steps involved in the use of the recording node by a utility commodity provider.

FIG. 7 is a flow chart of basic steps illustrating the use of the recording node by a utility commodity provider in the billing of the consumer and the monitoring of utility commodity usage. In step 700 the utility commodity flow data is received, stored and determined by the recording node. In step 710 the utility commodity information that is received and generated from the calculations is transmitted over the network to the utility commodity provider via the communication node. In step 720 the utility commodity provider may monitor the utility commodity information on a daily basis or any other time period. A normal utility commodity use pattern may be established over a period of time and if the use exceeds the normal by a set amount then a reminder may be sent to the consumer, step 730.

It is contemplated that with all three utility commodities, water, gas and electricity that appropriate signature data will be generated to aid in the identification of utility commodity usage by utility commodity using devices so that flow anomalies may be detected. When flow anomalies are detected the utility provider may send reminders to the consumer.

It is contemplated that the microprocessor 120, FIG. 1 would be programmed to provide the information in step 730 directly to the consumer. However, by providing this information also to the utility commodity provider in addition to the consumer may advantageously increase the likelihood that potential utility commodity flow anomalies will be checked and appropriate steps taken to correct the problem. Sending the information on flow anomalies to the utility commodity provider would especially be beneficial, if the consumer is frequently gone for extended periods of time from his/her residence.

Additionally, the utility commodity provider may use the utility commodity information received from the recording node to bill the consumer, step 740. The recording node receives the water, electricity and gas flow data and transmits it to the appropriate entity so the consumer may be billed for the utility commodity they use. Since only one device is required to obtain the water, gas and electricity flow data and additionally send it to the utility commodity provider, this should result in substantial savings to the providers of these utility commodities, which should result in reduced utility commodity costs to the consumer.

Figure 8:
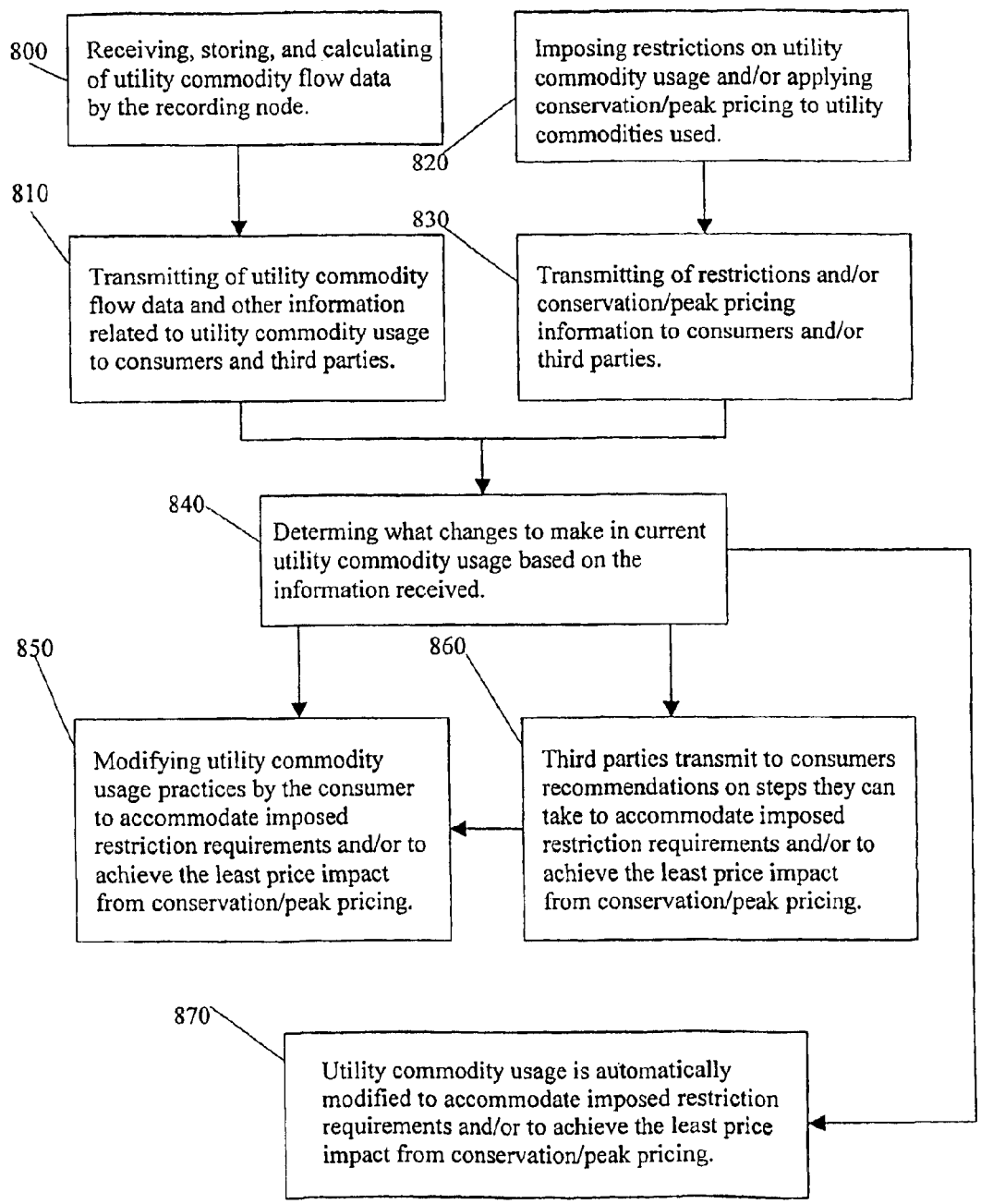
FIG. 8 is a flow chart of steps involved in the use of the recording node in the accommodating of imposed utility commodity restriction requirements and in the exercising of judicious use of the utility commodity when the utility commodity provider applies a conservation or peak pricing program to the utility commodity.

FIG. 8 is a flow chart of steps involved in the use of the recording node in the accommodating of imposed utility commodity restriction requirements and in the exercising of judicious use of a utility commodity when the utility commodity provider applies a conservation or peak pricing program to the utility commodity. Conservation pricing and peak pricing are used as incentives to get the consumer to reduce total use of a utility commodity or reduce utility commodity usage during a specific time period of the day, respectively. Utility commodity restrictions, conservation pricing and peak pricing could apply to anyone of the three commodities, water, electricity or gas. Although, certain practices are generally used with certain commodities, such as conservation pricing with water and peak pricing with electricity.

In step 800, the recording node receives, stores and determines utility commodity flow data. In step 810, the utility commodity flow data and other information, related to utility commodity usage, are transmitted over the network to the consumers and third parties via the computer node (See FIG. 3).

In step 820, restrictions are imposed on the use of a utility commodity and/or the utility commodity provider initiates conservation or peak pricing programs on the use of a utility commodity. The information on the restrictions, conservation pricing and/or peak pricing are transmitted over the network to the consumer and third parties via the computer node in step 830. Based on the information received the consumers and third parties consider possible changes the consumer might make in their use of utility commodities 840. In step 850, the consumer modifies their utility commodity usage practices to accommodate imposed restriction requirements on the use of a utility commodity and/or to achieve the least price impact from the initiation of a conservation or peak pricing program by the utility provider. Some of the changes the consumer may make, in their utility commodity usage, may be based on recommendations they receive from third parties, such as, water districts, electricity providers, and so forth 860.

It is contemplated that some of the changes in utility commodity usage will be automatically initiated based on programs that are installed in the microprocessor in step 870. The automatic modification of irrigation schedules to accommodate watering restrictions is discussed in a recent patent application, U.S. application Ser. No. PCT/US00/22819 the disclosure of which is incorporated herein by reference in its entirety.

Thus, specific embodiments and applications of methods and apparatus of the present invention have been disclosed. It should be apparent, however, to those skilled in the art that many more modifications besides those described are possible without departing from the inventive concepts herein. The inventive subject matter, therefore, is not to be restricted except in the spirit of the appended claims.

What is claimed is:

1. A recording node for controlling irrigation usage a consumer's site comprising:
   a receiving device that receives received data, comprising at least one of utility commodity flow data, utility commodity pressure data, evapotranspiration (ETo) data, and environmental data;
   a storage device that stores the received data;
   a determining device that determines at least one of a preferred usage and a mathematical relationship between the preferred usage and an actual usage; and
   a sending device that transmits at least one of the preferred usage and the mathematical relationship to at least one of a utility commodity provider and a governmental agency.

2. The recording node of claim 1, wherein the recording node is embodied in an irrigation controller.

3. The recording node of claim 1, wherein the recording node is embodied in a personal computer.

4. The recording node of claim 1, wherein the received data is obtained from a device local to the consumer's site.

5. The recording node of claim 1, wherein the received data is obtained from a device distal to the consumer's site.

6. The recording node of claim 1, wherein the consumer's site is a residential site.

7. The recording node of claim 1, wherein the consumer's site is a commercial site.

8. The recording node of claim 1, further comprising a communication network over which the recording node receives the received data.

9. The recording node of claim 8, wherein the communication network comprises a hardwire link to the consumer's site.

10. The recording node of claim 9, wherein the communication network comprises a wireless link to the consumer's site.

11. The recording node of claim 1, wherein the received data is directly received from at least one of a meter and sensor.

12. The recording node of claim 1, wherein the received data is manually inputted at the consumer's site.

13. The recording node of claim 1, wherein the utility commodity flow data measures water.

14. The recording node of claim 1, wherein the utility commodity flow data measures electricity.

15. The recording node of claim 1, wherein the utility commodity flow data measures gas.

16. The recording node of claim 1, wherein the utility commodity flow data is received from a utility meter at the consumer's site.

17. The recording node of claim 1, wherein the utility commodity flow data is received from a flow meter separate from a utility meter.

18. The recording node of claim 1, wherein the utility commodity flow data comprises raw data.

19. The recording node of claim 1, wherein the ETo data comprises current ETo data.

20. The recording node of claim 1, wherein The ETo data comprises estimated ETo data.

21. The recording node of claim 1, wherein the ETo data comprises historical ETo data.

22. The recording node of claim 1, wherein the environmental data includes data from at least one of air temperature, soil temperature, solar radiation, humidity, wind, cloud cover, and rainfall.

23. The recording node of claim 1, wherein the sending device transmits the usage data to a consumer.

24. The recording node of claim 1, wherein the determining device comprises a microprocessor.

25. The recording node of claim 1, wherein the preferred usage and the actual usage, represent a preferred irrigation value and an actual irrigation value, respectively that are determined over a period of time.

26. The recording node of claim 25, wherein the period of time is at least ten seconds.

27. The recording node of claim 25, wherein the preferred irrigation value is at least partly derived from the ETo data.

28. The recording node of claim 25, wherein the preferred irrigation value is at least partly derived from a crop coefficient value.

29. The recording node of claim 25, wherein the preferred irrigation value is at least partly derived from an irrigation efficiency value.

30. The recording node of claim 25, wherein the actual irrigation value is at least partly derived by dividing the utility commodity flow data by an area being irrigated.

31. The recording node of claim 1, wherein the mathematical relationship is a ratio of the preferred usage to the actual usage.

32. The recording node of claim 1, wherein the mathematical relationship is the difference between the preferred usage and the actual usage.

33. The recording node of claim 1, wherein the preferred usage and the mathematical relationship are transmitted over a communication network.

34. The recording node of claim 33, wherein the communication network comprises a hardwire link.

35. The recording node of claim 33, wherein the communication network comprises a wireless link.

* * * * *